Oct. 16, 1962    L. J. RAVER ETAL    3,059,169
GENERATOR REGULATOR CIRCUIT
Filed Sept. 8, 1959
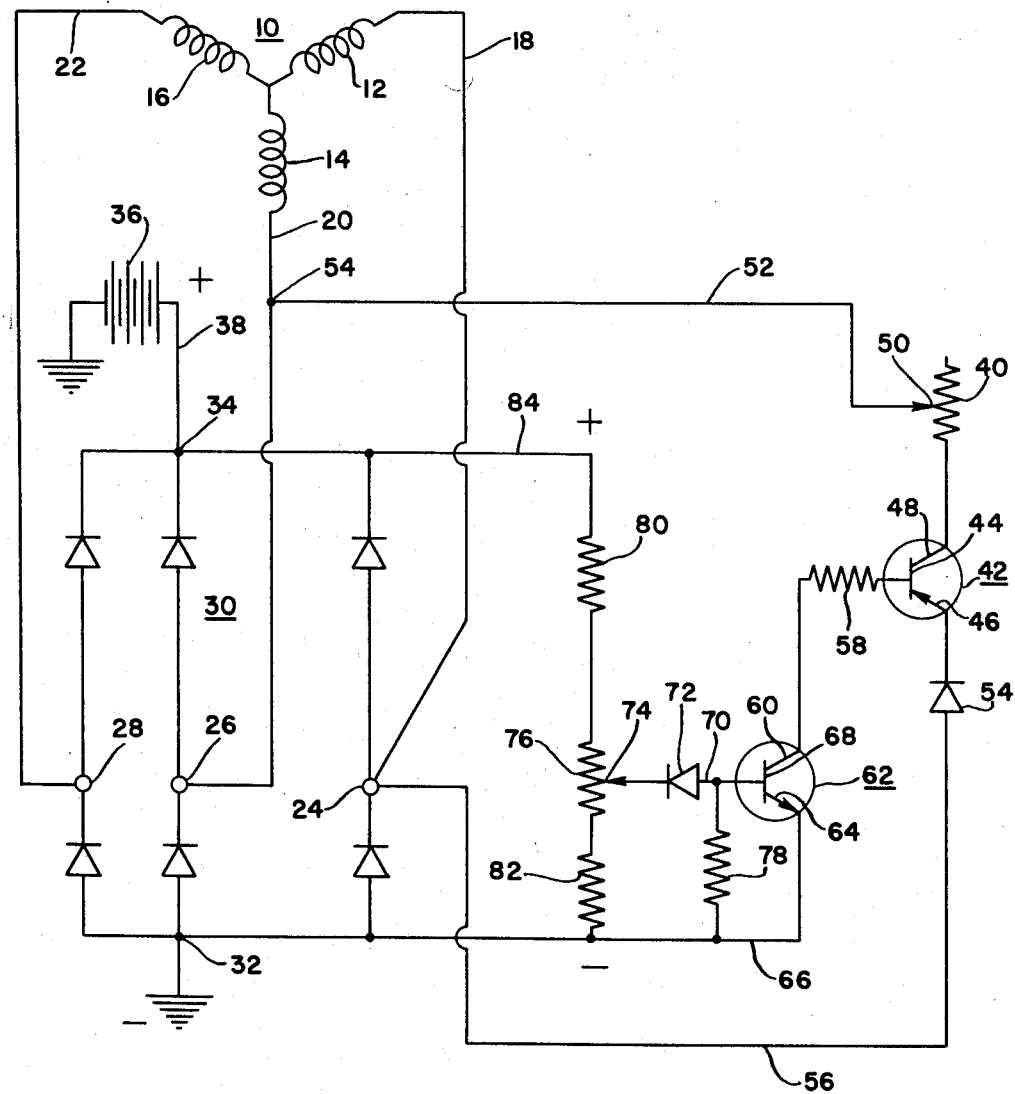
INVENTORS
Louis J. Raver
BY Robert W. Campbell
C. R. Meland
Their Attorney United States Patent Office 3,059,169
Patented Oct. 16, 1962

3,059,169
GENERATOR REGULATOR CIRCUIT
Louis J. Raver and Robert W. Campbell, Anderson, Ind., assignor to General Motors Corporation, Detroit, Mich., a corporation of Delaware
Filed Sept. 8, 1959, Ser. No. 838,668
7 Claims. (Cl. 322—95)

This invention relates to voltage regulators and more particularly to voltage regulating circuits for permanent magnet generators.

An object of this invention is to provide a voltage regulating circuit for a permanent magnet generator wherein a voltage applied to a load circuit is controlled by varying an auxiliary load as a function of output voltage.

Another object of this invention is to provide a battery charging system that includes an A.C. generator and a rectifier connected between the generator and battery, there being an auxiliary load circuit connected with the generator that has its load value varied in accordance with the voltage applied to the battery.

Still another object of this invention is to provide a regulating circuit for a generator that feeds a load circuit and an auxiliary regulating load circuit, the auxiliary load circuit including a semi-conductor such as a transistor which has its conductance varied as a function of the value of voltage applied to the load circuit.

A further object of this invention is to provide a regulating circuit for a generator that includes a regulating auxiliary load circuit, the auxiliary load circuit including a semi-conductor and a circuit element having resistance and wherein the conduction of the semi-conductor is controlled by a circuit including a voltage divider and a voltage responsive diode such as a Zener diode.

Further objects and advantages of the present invention will be apparent from the following description, reference being had to the accompanying drawing wherein preferred embodiments of the present invention are clearly shown.

In the drawings:

The single FIGURE drawing illustrates a regulating circuit made in accordance with this invention.

Referring now to the drawing, a permanent magnet generator designated by reference numeral 10 has an output winding including the phase windings 12, 14 and 16. The generator has a permanent magnet rotor of any well known construction (not shown) which is driven by an engine in motor vehicle installations. It is seen that the phase windings are Y-connected and are connected respectively with lead wires 18, 20 and 22. The lead wires 18, 20 and 22 are connected respectively with the input terminals 24, 26 and 28 of a three-phase full wave bridge rectifier designated in its entirety by reference numeral 30. One of the output terminals 32 of the bridge rectifier is connected directly to ground as is shown while the output terminal 34 is connected to one side of a storage battery designated by reference numeral 36. The opposite side of storage battery 36 is connected to ground as shown and it will be appreciated that loads other than the storage battery might be connected with lead 38 to be supplied with voltage and current from the rectifier 30.

The voltage regulating circuit for regulating the voltage applied between lead 38 and ground includes a resistor designated by reference numeral 40 and a semiconductor which in this case takes the form of a PNP transistor designated in its entirety by reference numeral 42. The transistor 42 has a base electrode 44, an emitter electrode 46 and a collector electrode 48. The resistor 40 is tapped as at 50 and this tap point may be shifted in order to vary the amount of resistance appearing between the collector electrode 48 of transistor 42 and the lead wire 52. It is seen that the lead wire 52 is connected with lead wire 20 at junction 54. The emitter electrode 46 of transistor 42 is connected to one side of a rectifier 54 the opposite side of the rectifier being connected with the junction 24 via lead wire 56. The lead wires 18 and 56 are both connected with junction 24 as is clearly apparent from the drawing.

The base electrode 44 of transistor 42 is connected with a resistor 58. The opposite side of resistor 58 is connected with the collector electrode 60 of an NPN transistor designated by reference numeral 62. The emitter electrode 64 of transistor 62 is connected with lead wire 66 that is in turn connected to ground. The base electrode 68 of transistor 62 is connected with a lead wire 70. The lead wire 70 is connected to one side of a Zener diode 72, the opposite side of the diode being connected to a tap point 74 on a potentiometer 76. The Zener diode has the characteristic of preventing reverse current flow therethrough until a predetermined voltage is applied thereacross whereupon it breaks down and operates as a constant voltage device. This diode is well known to those skilled in the art.

The lead wire 70 connecting the base electrode of transistor 62 and the Zener diode 72 is connected with lead wire 66 through a resistor 78. The potentiometer 76 forms a part of a voltage dividing network that includes resistor 80 and resistor 82. It is seen that the voltage dividing network is connected between leads 66 and 84 and will therefore have a voltage applied to it which is the same as the voltage applied between lead 38 and ground and this corresponds to the voltage applied to the load circuit.

It will be apparent to those skilled in the art that when the transistor 42 is conducting between emitter and collector the portion of the resistor 40 in the circuit will be connected between junctions 24 and 54 and thus will be connected directly across phase windings 12 and 14. When the transistor 42 is fully conductive, the current that must be supplied to auxiliary load 40 will cause the output voltage of the generator to drop so that less voltage will be applied to the load circuit that includes the battery 36. The current supplied to the auxiliary load 40 will be pulsating direct current due to the provision of rectifier 54.

The conduction of transistor 42 is controlled by the transistor 62, the Zener diode 72 and the voltage dividing network that includes potentiometer 76 and resistors 80 and 82. The circuit constants are such that when the voltage appearing between tap point 74 and lead 66 is above the desired regulated value the Zener diode 72 conducts and base-emitter current flows in transistor 62. With base to emitter current flowing in transistor 62 the transistor becomes conductive between collector and emitter to provide a current path for base current in transistor 42. With transistor 42 conducting between emitter and base, the transistor becomes substantially fully conductive between emitter and collector to connect junctions 24 and 54 through the portion of the resistor 40 that is in the circuit. With resistor 40 in the circuit the output voltage of the generator is reduced to bring the voltage back to the desired value. When the voltage drops to the desired regulated value, the base current in transistor 62 is cut off to likewise cut off its collector to emitter current path and thus cut off the emitter to base current of transistor 42 with the consequent shutting off of transistor 42. It thus will be apparent to those skilled in the art that the voltage dividing network 80, 76 and 82 operates as a sensing circuit to sense the voltage being applied between lead 38 and ground and that this voltage is used to control the conduction of transistor 42 through Zener diode 72 and transistor 62.

It will be apparent to those skilled in the art that the phase windings 14 and 16 and 12 and 16 might also have regulating circuits connected across them which are identical with the circuit connected across phase windings 12 and 14.

While the embodiment of the present invention as herein disclosed, constitutes a preferred form, it is to be understood that other forms might be adopted.

What is claimed is as follows:

1. In combination, an alternating current generator having an A.C. output winding, a direct current load circuit, rectifier means connected between said A.C. output winding of said generator and said load circuit for supplying said load circuit with direct current, and an auxiliary regulating circuit separate from said load circuit connected across the output winding of said A.C. generator, said auxiliary regulating circuit including a series connected resistor, a transistor and a rectifier separate from said rectifier means, and means for controlling the conduction of said transistor in its emitter-collector circuit as a function of the voltage applied across said D.C. load circuit.

2. In combination, a permanent magnet generator having a three phase output winding, a D.C. load circuit, a three phase full wave bridge rectifier network having input terminals connected with said three phase output winding and having a pair of D.C. output terminals connected with said load circuit, an auxiliary regulating circuit separate from said D.C. load circuit including a transistor having its emitter-collector circuit connected between a pair of phase windings of said three phase output winding, and means for controlling the conduction of said transistor as a function of the D.C. voltage applied across said load circuit.

3. In combination, an A.C. generator having a three phase A.C. output winding, a D.C. load circuit, a three phase full wave bridge rectifier having input terminals connected with said three phase output winding and having a pair of D.C. output terminals connected with said load circuit for supplying said load circuit with direct current, an auxiliary load circuit separate from said direct current load circuit including a series connected transistor and rectifier connected with said three phase output winding, said rectifier being separate from said bridge rectifier, and means for controlling the conduction of said transistor as a function of the voltage appearing across said D.C. load circuit.

4. In combination, an A.C. generator having a three phase output winding, a three phase full wave bridge rectifier network, a D.C. load circuit, said bridge rectifier network having input terminals connected with said three phase output winding and having a pair of output terminals feeding said direct current load circuit, an auxiliary regulating circuit separate from said load circuit, said auxiliary regulating circuit including a resistor, a first transistor and a rectifier separate from said bridge rectifier network connected across a pair of phase windings of said three phase output windings, a second transistor having a collector electrode connected with the base electrode of said first transistor, a voltage dividing network connected across said D.C. load circuit, and a Zener diode connected between said voltage dividing network and the base electrode of said second transistor.

5. In combination, an alternating current generator having a three phase output winding, a three phase full wave bridge rectifier network having input terminals connected with said three phase output winding and having a pair of D.C. output terminals feeding a D.C. load circuit, an auxiliary regulating circuit separate from said load circuit connected across two phases of said three phase output winding, said auxiliary regulating circuit including in a series connection, a resistor, a diode and a semiconductor switch means, and a voltage sensing circuit including a constant voltage device connected with said semiconductor switch means for controlling the conduction of said semiconductor switch means, said voltage sensing circuit being connected across said load circuit so as to sense the D.C. output voltage of said bridge rectifier network.

6. The combination according to claim 5 wherein the semiconductor switch means is a transistor.

7. The combination according to claim 5 wherein the constant voltage device is a Zener diode.

References Cited in the file of this patent

UNITED STATES PATENTS

| 337,776 | Loomis et al. | Mar. 9, 1886 |
| 2,015,556 | Fountain | Sept. 24, 1935 |
| 2,809,301 | Short | Oct. 8, 1957 |
| 2,850,694 | Hamilton | Sept. 2, 1958 |
| 2,874,346 | Orvis | Feb. 17, 1959 |
| 2,877,402 | Hallidy | Mar. 10, 1959 |
| 2,938,128 | Logan | May 24, 1960 |

FOREIGN PATENTS

| 645,712 | France | July 3, 1928 |